US011873969B2

(12) United States Patent
Yang et al.

(10) Patent No.: US 11,873,969 B2
(45) Date of Patent: *Jan. 16, 2024

(54) WALL WASH MICRO LIGHTING FIXTURE

(71) Applicant: USAI, LLC, New Windsor, NY (US)

(72) Inventors: Yi Yang, New Windsor, NY (US); Timothy Wickham, Tappan, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/155,412

(22) Filed: Jan. 17, 2023

(65) Prior Publication Data

US 2023/0151937 A1 May 18, 2023

Related U.S. Application Data

(63) Continuation of application No. 17/850,466, filed on Jun. 27, 2022, now Pat. No. 11,555,587.

(60) Provisional application No. 63/215,084, filed on Jun. 25, 2021.

(51) Int. Cl.

| | |
|---|---|
| ***F21S 8/02*** | (2006.01) |
| ***F21V 5/04*** | (2006.01) |
| ***F21V 3/00*** | (2015.01) |
| ***F21V 7/06*** | (2006.01) |
| *F21Y 115/10* | (2016.01) |

(52) U.S. Cl.

CPC ................ *F21S 8/026* (2013.01); *F21V 3/00* (2013.01); *F21V 5/045* (2013.01); *F21V 7/06* (2013.01); *F21Y 2115/10* (2016.08)

(58) Field of Classification Search

CPC ............. F21V 7/06; F21V 5/045; F21S 8/026

See application file for complete search history.

(56) References Cited

U.S. PATENT DOCUMENTS

| | | | | |
|---|---|---|---|---|
| 2013/0155671 A1* | 6/2013 | Kurt | F21V 5/04 | 362/231 |
| 2014/0111984 A1* | 4/2014 | Rodgers | F21V 5/005 | 257/E33.072 |
| 2014/0211504 A1* | 7/2014 | Yuan | G02B 6/0078 | 385/39 |
| 2015/0078011 A1* | 3/2015 | Sy | F21V 7/048 | 362/327 |
| 2015/0260905 A1* | 9/2015 | Yuan | G02B 6/0035 | 362/616 |
| 2015/0345742 A1 | 12/2015 | Radl et al. | | |
| 2016/0076743 A1* | 3/2016 | Deutsch | F21V 7/0091 | 362/268 |

* cited by examiner

*Primary Examiner* — Christopher E Dunay

(74) *Attorney, Agent, or Firm* — St. Onge Steward Johnston & Reens LLC

(57) ABSTRACT

A wall wash recessed light fixture has a light engine assembly has an aperture, an LED module operable to emit light through the aperture, a lens disposed between the LED module and the aperture, and a reflector disposed between the LED module and the lens. The LED module has an optical axis passing through the aperture and substantially parallel to a longitudinal axis (Z). The lens has a first side forming a plano-convex lens with a convex surface facing the LED module and has a second side with a Fresnel lens surface facing the aperture, and the lens is aligned at an oblique angle $\Theta_1$ relative to the optical axis of the LED module. A diffuser is disposed between the lens and the aperture. The plano-convex lens has a principal axis aligned at the oblique angle $\Theta_1$ relative to the optical axis of the LED module.

15 Claims, 15 Drawing Sheets

Total Collected Power = 59.418 lm
Efficiency = 0.47213
Maximum Intensity = 69.727 cd

WALL WASH MICRO LIGHTING FIXTURE

FIELD OF THE INVENTION

The invention pertains to the field of lighting fixtures, and in particular, recessed wall wash lighting fixtures.

BACKGROUND OF THE INVENTION

A purpose of wall wash light fixture is to illuminate a typically vertical wall with a fixture installed in a typically horizontal ceiling. Often wall wash light fixtures are recessed within a ceiling such that all or a majority of the components of the light fixture are at or above the lower surface of the ceiling.

General desired performance characteristics for wall wash light fixtures include: light uniformity on the wall, with maximum to minimum brightness ratio of about 4:1, minimal glare in the directions perpendicular and parallel to the wall, an absences of dark bands across the top of the wall, an absence of "scalloping" on the wall between adjacent, spaced-apart wall wash fixtures, and an absence of color separation on the wall. Known wall wash fixtures do not meet all of these desired characteristics.

SUMMARY OF THE INVENTION

A purpose of the inventive wall wash micro light fixture is to illuminate a typically vertical wall with a fixture installed in a typically horizontal ceiling. The wall wash light fixture is recessed within a ceiling such that all or a majority of the components of the light fixture are at or above the lower surface of the ceiling.

The wall wash micro light fixture of the present design provides the aforementioned desired performance characteristics including light uniformity on the wall, minimal glare, an absence of dark bands at the top of the wall and an absence of light "scalloping." The present design provides such performance characteristics while having a small form factor and small aperture size.

The inventive wall wash recessed light fixture configured according to the present design is operable to emit light through an opening in a ceiling toward a wall adjacent to the opening. The light fixture has a light engine assembly having an aperture, an LED module operable to emit light through the aperture, a lens disposed between the LED module and the aperture, and a reflector disposed between the LED module and the lens. The LED module has an optical axis passing through the aperture and substantially parallel to a longitudinal axis (Z).

The lens is operable to narrow a beam of light from the LED module vertically along a height of the adjacent wall, and to expand the beam horizontally along a length of the wall. The lens has a first side forming a plano-convex lens with a convex surface facing the LED module and a second side with a Fresnel lens surface facing the aperture, and the lens is aligned at an oblique angle $\Theta_1$ relative to the optical axis of the LED module. The plano-convex lens has a principal axis aligned at the oblique angle $\Theta_1$ relative to the optical axis, and has a center of curvature offset laterally from the optical axis. The aperture of the light engine assembly is disposed between the center of curvature and the lens. The plano-convex lens is partially cylindrical and has an axis of curvature passing through the center of curvature and perpendicular to the optical axis of the LED module.

The Fresnel lens surface is aligned at the oblique angle $\Theta_1$ relative to the optical axis of the LED module and has a plurality of facets having varying slope angles that increase from a first lateral end of the lens (closest to the wall) to an opposite second lateral end. The facets of the Fresnel lens surface are aligned substantially parallel to a width axis (X) of the light engine assembly.

The plano-convex lens and the Fresnel lens can comprise an integrated lens or can be a composite lens with separate pieces which are optically coupled.

The trim element can include a kicker reflector disposed adjacent the second lateral side of the lens, with the aperture disposed between the kicker reflector and the lens.

The wall wash recessed light fixture can include a diffuser operable to diffuse light passing through the lens. A diffuser can be disposed adjacent the Fresnel lens surface and aligned at the oblique angle $\Theta_1$ relative to the optical axis of the LED module. Alternatively or additionally, a diffuser can be disposed in the aperture of the light engine assembly perpendicular to the optical axis.

The wall wash recessed light fixture can include an enclosure with an enclosure aperture and adapted to be mounted to a ceiling structure; and the light engine assembly is configured to be mountable to the enclosure through the enclosure aperture.

DETAILED DESCRIPTION OF THE INVENTION

Figure 1A:
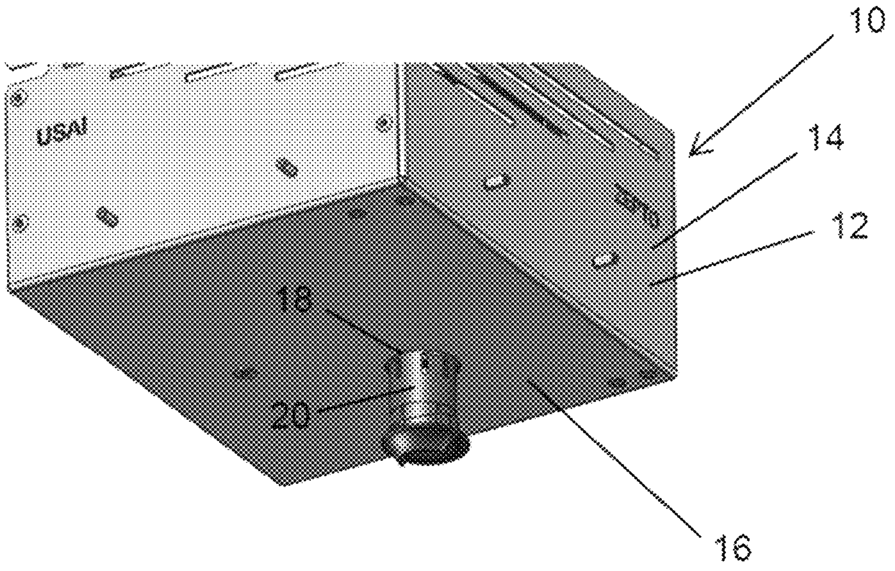
FIG. 1A is perspective view, from the bottom, of a first preferred embodiment of the light fixture.
Figure 1B:
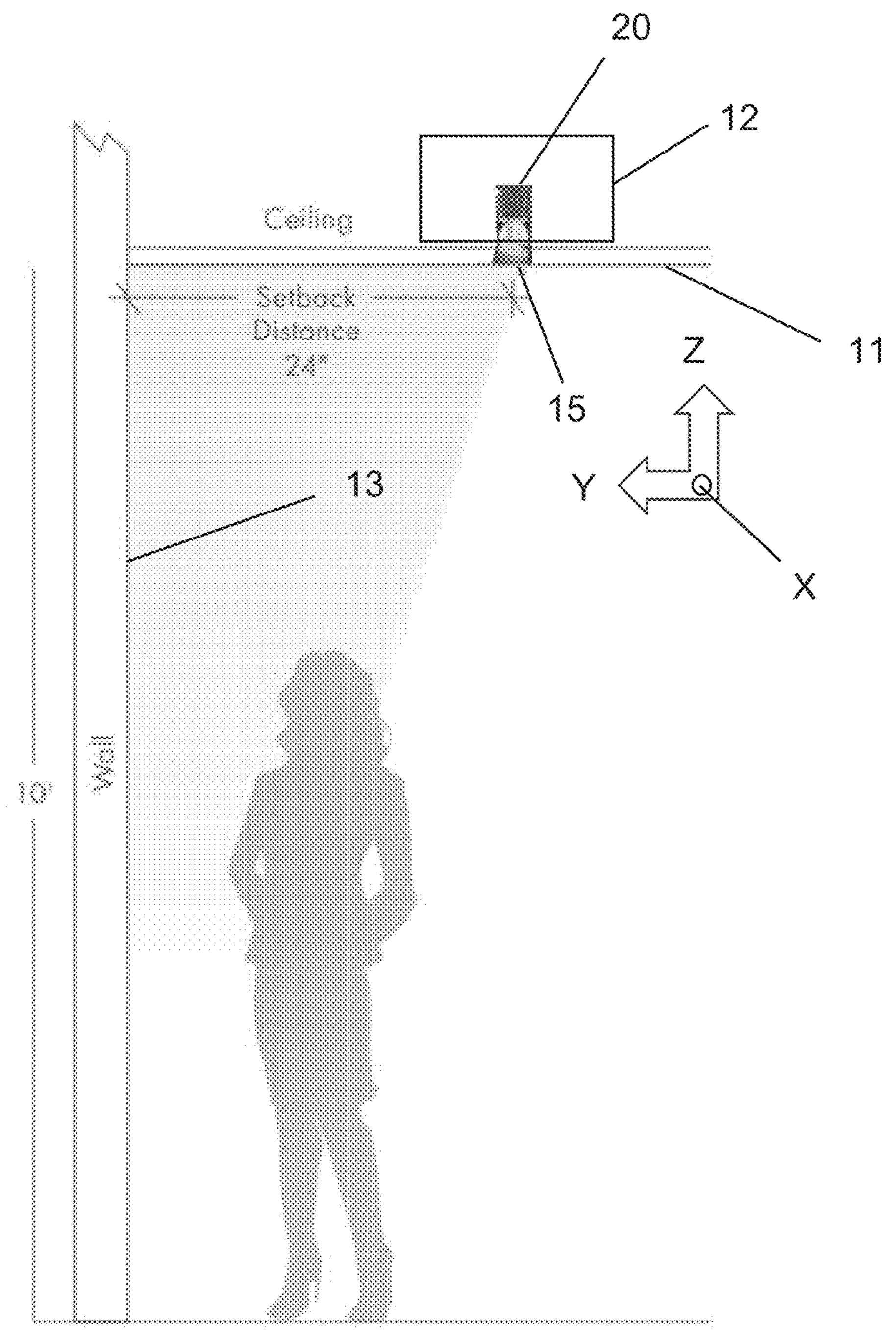
FIG. 1B is a schematic view of the light fixture of FIG. 1 as installed.
Figure 1C:
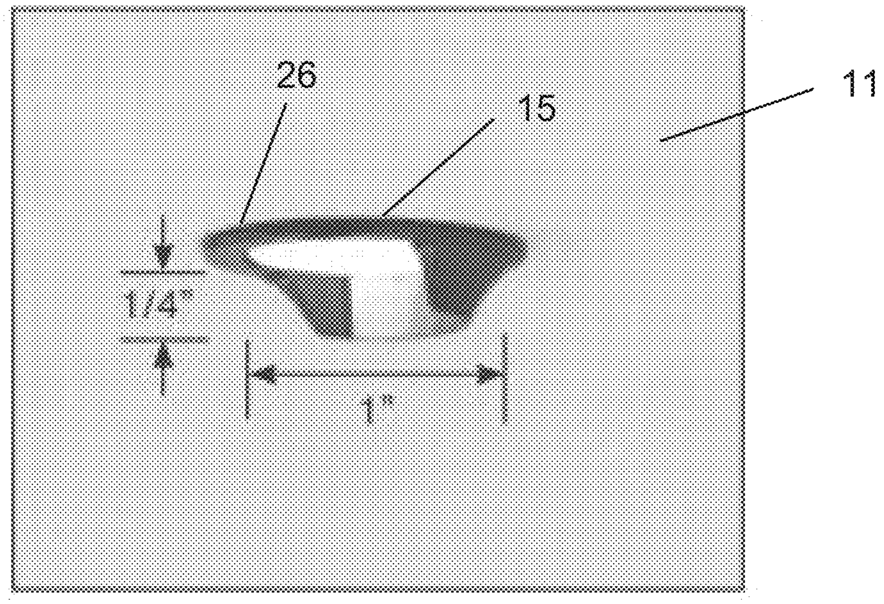
FIG. 1C is a close-up perspective view of the light fixture of FIG. 1 as installed.
Figure 2:
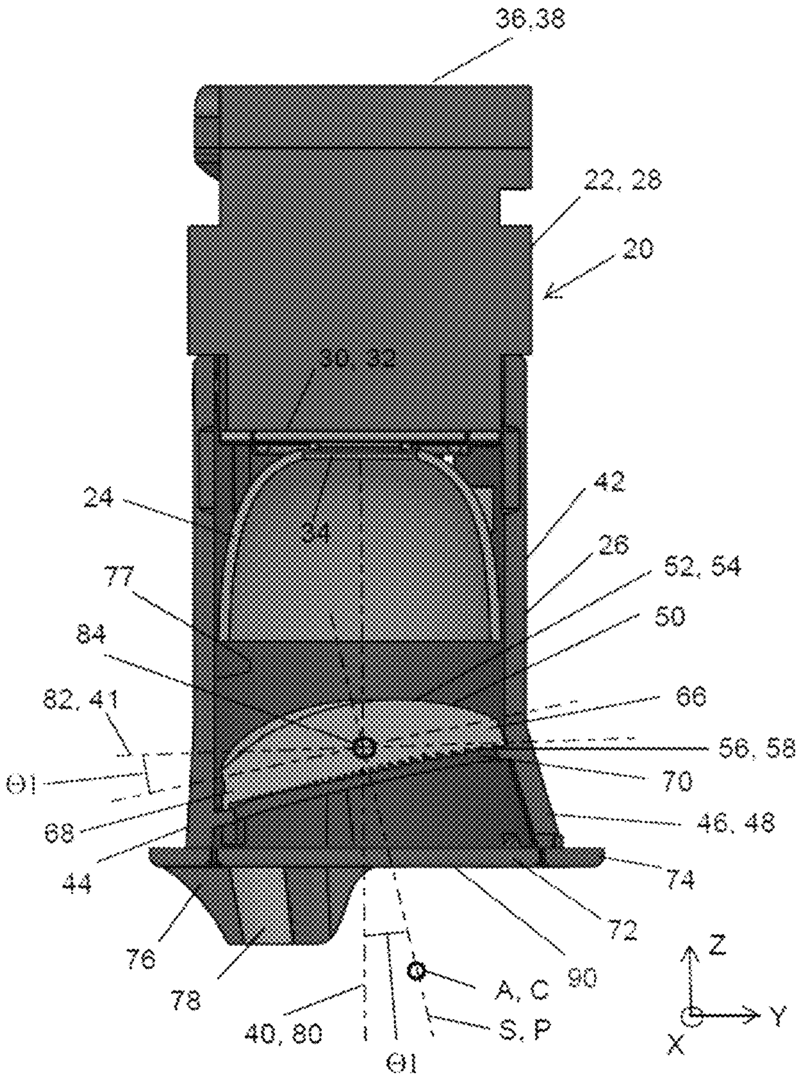
FIGS. 2 and 3 are cross sectional views, from the side, of a light engine assembly of the light fixture of FIG. 1.
Figure 3:
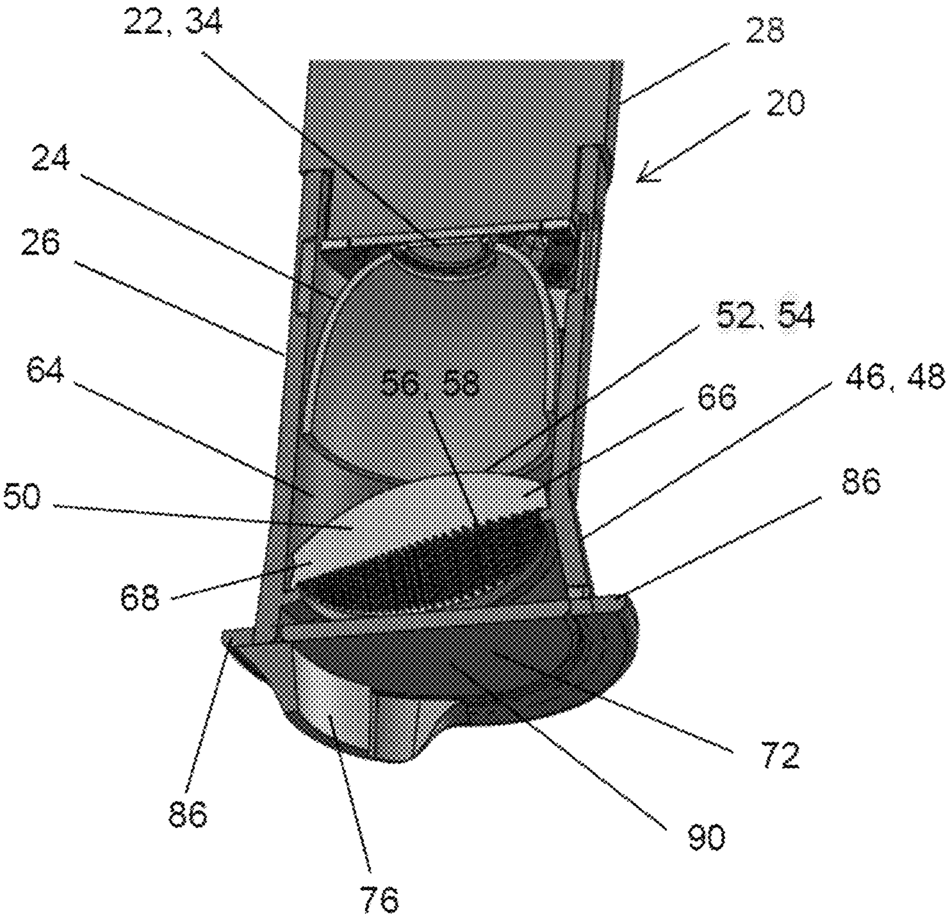
Figure 4:
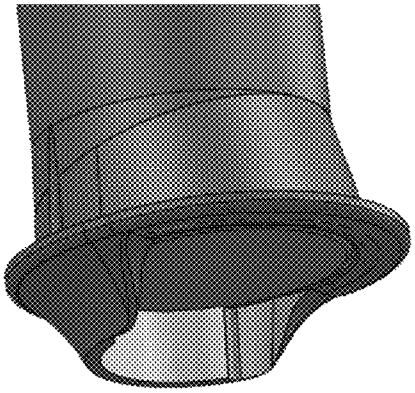
FIG. 4 is side view of a bottom portion of the light engine assembly of FIG. 2.
Figure 5:
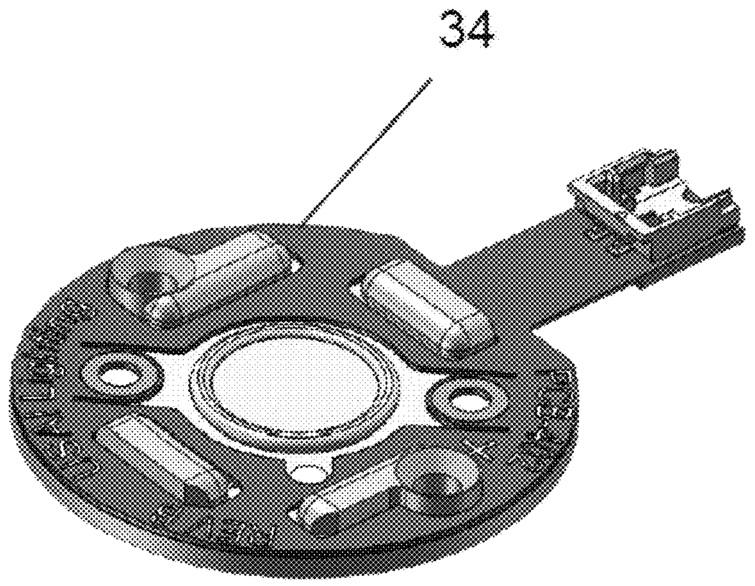
FIG. 5 is a view of the LED of the light engine assembly of FIG. 2.
Figure 6:
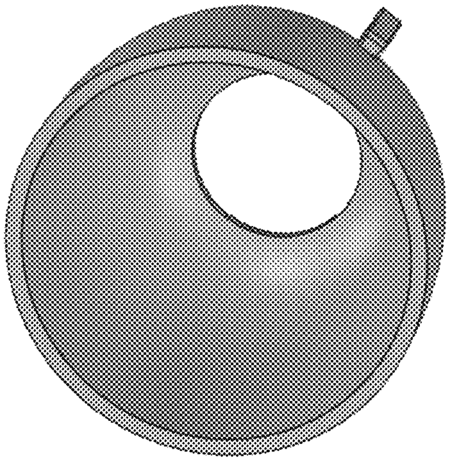
FIG. 6 is bottom view of the reflector of the light engine assembly of FIG. 2.
Figure 7:
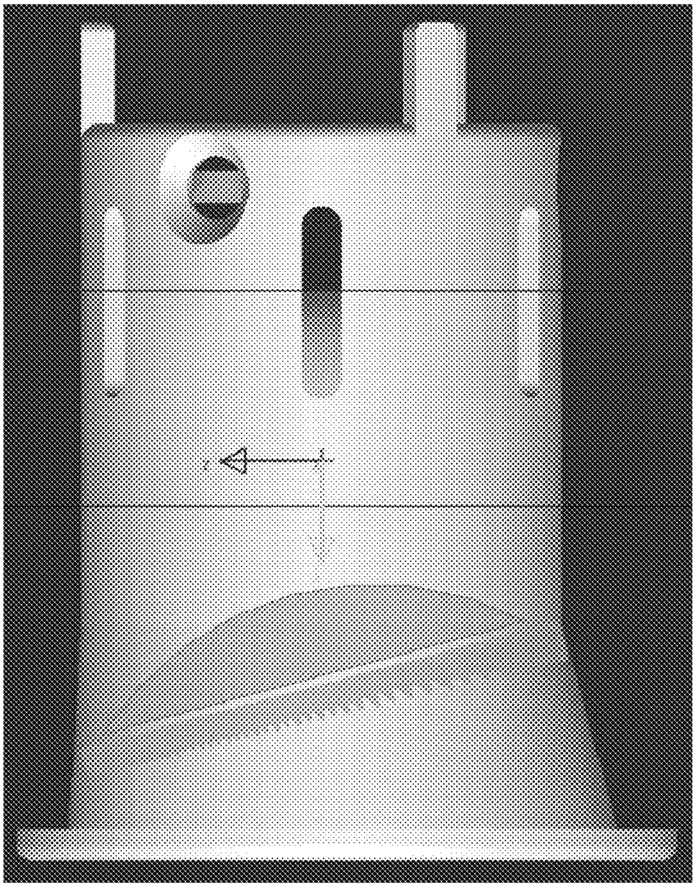
FIG. 7 is a schematic view, from the side, of the light engine assembly of FIG. 2, showing the lens.
Figure 8:
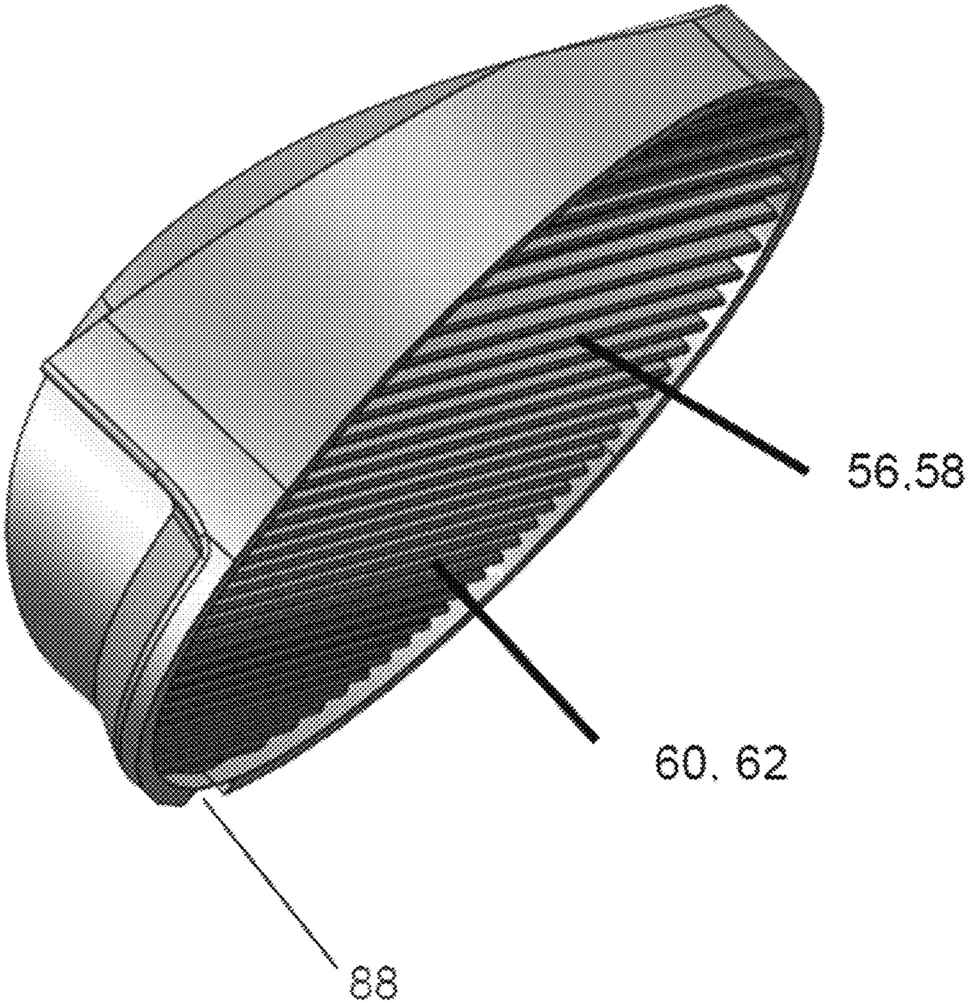
FIG. 8 is a perspective view of the lens, from the bottom.
Figure 9:
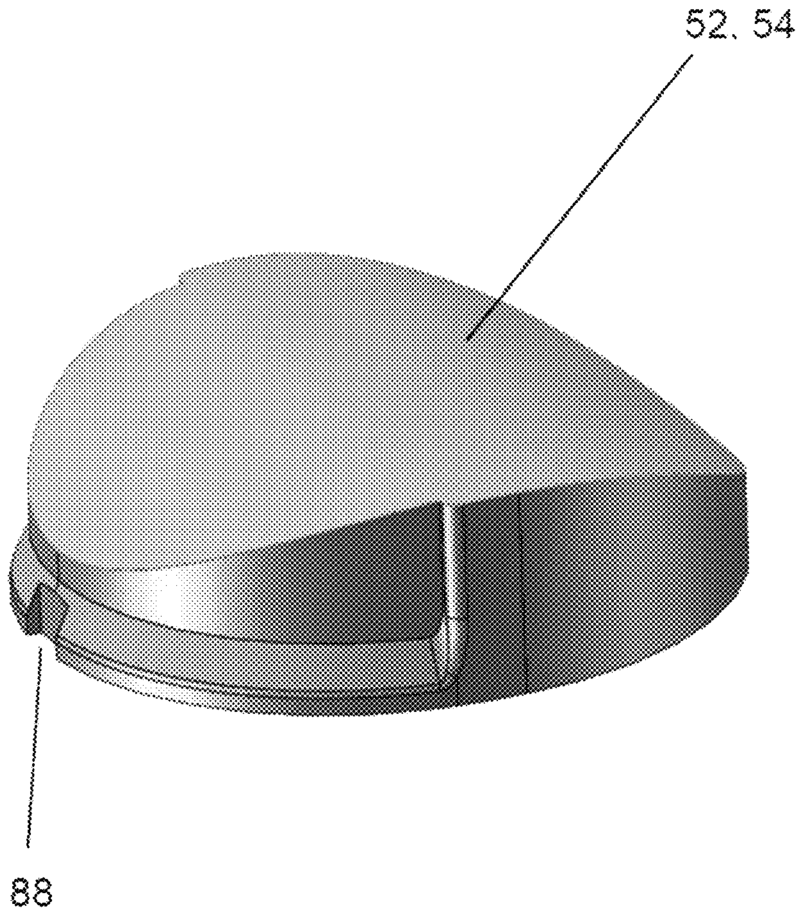
FIG. 9 is a perspective view of the lens, from the top.

Referring to FIGS. 1-12C a first preferred embodiment of the wall wash micro light fixture 10 10 is configured to emit light through an opening 15 in a ceiling 11 and toward an adjacent wall 13 of the room therebelow. The light fixture 10 can have an enclosure 12 with side walls 14, a top (not shown), and a bottom wall 16 with an aperture 18 therethrough, for example having a diameter of about 1 inch or more. The enclosure 12 is adapted to be fastened to support structure (for example via hanger bars) above a ceiling structure (such as plaster board), and remains above the ceiling.

The light fixture 10 includes a light engine assembly 20 which can include an LED module 22, a specular reflector 24, a trim element 26, and an aperture 90, which can be a covered or uncovered optical aperture operable to permit the passage of light therethrough. The LED module 22 can have a base 28 with a lower portion 30 having a lower surface 32 (normally horizontal and downwardly facing). An LED 34 can be mounted to the lower surface 32 of the base 28 and is operable to emit light through the light engine assembly 20 and into the room. The LED 34 can be, for example, a 6 mm chip-on-board (COB) LED. The reflector 24 is preferably disposed around the LED 34. The base 28 can also include an upper portion 36 having an upper surface 38 (normally horizontal and upwardly facing). An electrical connector (not shown) can be connected to the LED 34 by wires and is operable to releasably connect to a lighting driver (not shown) within the enclosure 12 to power the LED.

The light engine assembly 20 is preferably adapted to be removed from the enclosure 12 through the aperture 18 of the enclosure 12, from within the room, without removing the enclosure 12 and without disturbing the ceiling. To achieve this aspect, the light fixture can include a non-removable heat sink (not shown) disposed within the enclosure 12, and at least the LED module 22 (and permissibly other components of the light engine assembly 20) can have mechanical, electrical and thermal connection structures and features operable to connect to the enclosure and/or heat sink disposed therein, such as described in applicant's co-pending application for a High Output (Micro) Luminary, having Ser. No. 17/201,863, the disclosure of which is incorporated by reference herein in its entirety.

The trim element 26 can be connected to the base 28, such as by one or more screws (not shown) or other means, and preferably surrounds the lower portion 30 of the base 28 and LED 34. Portions of the lower and upper surfaces 30, 36 of the base 28 can form lower and upper thermal interfaces, respectively. The upper portion 36 of the base 28 can be substantially cylindrical in shape, with a substantially circular cross section and with the upper surface 38 (and thermal interface thereof) being substantially circular. For a light fixture configured for about a 1 inch diameter ceiling opening, for example, a maximal outside diameter of the upper portion 36 of the base 28 can be about 0.96 inches and the surface area of the upper thermal interface can be about 0.72 square inches ($\pi$*(diameter squared)/4). For such an application, the base 28 can have a height of about 0.9 inches between the upper and lower surfaces thereof.

The base 28 of the LED module 22 is preferably adapted and operable to effectively conduct heat generated by the LED 34 from the lower thermal interface to the upper thermal interface. The base 28 can be solid (or at least substantially solid) and can include (or can consist or consist essentially of) one or more materials having high thermally conductivity, such aluminum or copper, or another suitable metal or alloy, or non-metallic material.

As described in the aforementioned co-pending application of the applicant, the heat sink of the light fixture 10 can have a planar thermal interface which is configured for thermal connection with the upper thermal interface of the base 28 of the LED module 22, and which is aligned with and disposed over the aperture 18 of the enclosure 12. The heat sink is adapted and operable to receive heat generated by the LED 34 through the thermal interfaces and to dissipate such heat to ambient air.

The light fixture 10 can be oriented or aligned relative to mutually perpendicular axes (X,Y and Z). The light fixture 10 can have a longitudinal axis 80 parallel to the Z axis, a lateral axis 82 parallel to the Y axis, and a width axis 84 parallel to the X axis.

In a typical installation where the ceiling 11 is horizontal and the adjacent wall 13 is vertical, the X and Y axis (and width axis and lateral axis) are horizontal and the Z axis (and longitudinal axis) is vertical, and an X-Y plane is parallel to a plane of the ceiling 11 and perpendicular to a plane of the adjacent wall 13, an X-Z plane is parallel to the plane of the wall 13 and perpendicular to the plane of the ceiling 11, and a Y-Z plane is perpendicular to the planes of the ceiling 11 and wall 13.

The light engine assembly 20, and particularly the LED module (and with the reflector 24) has an optical axis 40 which is preferably disposed on or parallel to the longitudinal axis 80 of the light engine assembly, and, in in typical operation, the light fixture 10 and light engine assembly 20 are installed in an orientation such that both the longitudinal axis and the optical axis 40 are vertical or substantially vertical, or perpendicular to the ceiling or other structure in which the light fixture is mounted.

An upper portion 42 of the trim element 26 can have a substantially tubular or cylindrical shape with a corresponding circular (typically horizontal) cross section perpendicular to the optical axis 40. A lower portion 44 of the trim element 26 can have a radially outwardly extending portion 46 on a wall-facing side 48 thereof such that the lower portion 44 has a somewhat oblong (horizontal) cross section. As described further below, this extending portion facilitates lateral light projection toward the adjacent wall surface.

The lower portion 44 of the trim element 26 can also include a circumferential flange 86 (e.g., a micro flange) extending radially outwardly (e.g., about ⅛-¼ in, for an about 1 inch ceiling opening) around a circumference thereof and configured to abut a lower surface of the ceiling 11 surrounding the opening 13.

The light engine assembly 20 includes a lens 50 disposed below the reflector 24 which is configured to direct light emitted by the LED 34 toward the adjacent wall surface. The lens 50 includes an upper portion 52 (or barrel side) in the form of a plano-convex lens 54, and includes a lower portion 56 (Fresnel side) in the form of a linear Fresnel lens 58. The convex portion of the plano-convex lens 54 faces upwardly, generally toward the LED 34, and is preferably partially cylindrical.

The convex surface of the plano-convex lens 54 has a center of curvature C disposed below the trim element 26 and offset laterally (Y axis) from the optical axis 40. Since the convex surface is partially cylindrical, it has an axis of curvature A which passes through the center of curvature C. The axis of curvature A is perpendicular to the optical axis 40, and in use is preferably typically horizontal and parallel to the adjacent wall. A radius of curvature of the convex surface can have a length of about 16.13 mm (0.635 in).

The plano-convex lens 54 serves and is operable to narrow the beam in one direction (vertically, along a height of the adjacent wall 13 to be illuminated) and to expand the beam in the other direction (horizontal, along a length of the wall), to achieve the desired light distributions.

The linear Fresnel lens 58 serves to direct light laterally toward the wall to be illuminated while having low light absorption. The Fresnel lens 58 faces downwardly, generally away from LED 34, such that the facets or grooves 60 thereof are disposed on a bottom surface 62 of the lens 50. A distance between the bottom surface 62 of the lens 50 and the center/axis of curvature C, A of the convex surface of the plano-convex lens 54 can be about 9.85 mm (0.388 in).

The lens 50 can be described as a tilted linear Fresnel lens with a convex back. The lens 50 is disposed at an oblique angle $\Theta_1$ relative to a (typically horizontal) lateral axis 82 or plane 41 perpendicular to the optical axis 40 such that plano-convex lens 54 and the Fresnel lens 58 are likewise disposed at the oblique angle $\Theta_1$ relative to the optical axis 40. The oblique angle $\Theta_1$ can preferably be an acute angle of, for example, 15 degrees. More specifically, the lens 50 (and/or the plano-convex lens 54) can have a plane of symmetry S (or substantial symmetry) which is generally perpendicular to the Fresnel lens 58 portion of the lens 50, generally normal at an intersection with convex surface of the plano-convex lens 54, and/or on which lies the center/axis of curvature C, A of the cylindrical portion of the plano-convex lens 54. The plane of symmetry S can be disposed at the oblique angle $\Theta_1$ relative to the optical axis 40.

Alternatively, or additionally, a principal axis P of the plano-convex lens 54 (which may also be considered a principal plane) can be aligned at the oblique angle $\Theta_1$ relative to the optical axis 40 and/or can be substantially perpendicular to the Fresnel lens 58.

Due to the oblique orientation of the lens 50, in use, a first lateral end 66 of the lens 50 is disposed higher (i.e., closer to the LED module) than a second lateral end 68 of the lens, opposite the first end, with respect to the lateral axis 82 (Y axis). In use, the first end is aligned toward the wall to be illuminated by the light fixture.

The lens 50 preferably extends radially outwardly to occupy the interior of the trim element 26 such that it closely abuts the interior wall 64 of the trim element 26, such that all or substantially all of the light emitted by the light fixture into the room passes through the lens 50. As described above, the trim element 26 can have a substantially circular cross section, as taken perpendicular to the optical axis 40. Therefore, the lens 50, which is at an oblique angle $\Theta_1$ relative to the optical axis 40, may have a substantially elliptical or oval periphery. For example, in a light fixture having an aperture of about 1 inch, the lens 50 can have a long axis of about 20.7 mm (0.815 in) and a short axis of about 19.8 mm (0.780 in)

The Fresnel lens 58 can include many prismatic features (facets) that have varying angles and depths. The prismatic features are designed such that a specific focal length can be achieved. For example, the focal length can be about 14 mm and a maximum depth and width of the facets can be about 1 mm.

The grooves 60 of the Fresnel lens 58 are preferably parallel and are aligned parallel to the width axis 86 (X axis) and/or perpendicular to the optical axis 40 and/or the principal axis P, and/or parallel to the plane of symmetry S. In use, the grooves 60 are generally horizontal and/or parallel to the wall to be illuminated. The configuration (i.e., shape) of the facets and grooves 60 of the Fresnel lens 58 can be asymmetric with respect to plane of symmetry S of the lens 50 and/or the principal axis P of the plano-convex lens 54. In particular, a slope angle of the grooves can increase from a relatively shallow angle adjacent the first lateral end 66 of the lens 50 to a relatively steep angle adjacent the second end 68.

The plano-convex lens 52 and the Fresnel lens 58 portions of the lens 50 can be a composite structure having two separate lenses, or can be one combined or integral lens. In the case of a composite lens, flat or complementary sides of the plano-convex lens 54 and the Fresnel lens 58 would preferably be in an abutting relationship, or otherwise optically coupled. The lens material can be UV stabilized polycarbonate such that will avoid yellowing under strong LED light in high temperature and high humidity environment.

The lens 50 can include an alignment recess 88 configured to receive a complementary alignment projection (not shown) of the trim element 26 such that lens 50 is positively aligned when inserted into the trim element, for example through the upper portion 42 thereof.

The light engine assembly 20 preferably can include two layers of diffusers, which can be mounted or supported by the trim element 26. The diffusers provide improved color mixing and glare reduction and serve to direct light toward the top of the adjacent wall to be illuminated without affecting or reducing the overall light distribution on the remainder of the wall. An upper diffuser 70 can be disposed below the lens 50, adjacent the Fresnel lens 58. Preferably the upper diffuser 70 is disposed immediately below the lens 50 and can be in contact therewith, and can optionally be a support for the lens 50. The upper diffuser 70 is preferably planar and aligned at the same oblique angle $\Theta_1$ as the lens 50. The upper diffuser 70 can comprise an ultra-thin diffusion material.

A lower diffuser 72 can be disposed at a bottom 74 of the trim element 26, for example in the aperture 90 of the light engine assembly. The lower diffuser can be planar and disposed perpendicular to the optical axis 40, such that it is generally horizontal when the light fixture 10 is in use. As can be appreciated, only the lower diffuser 72 directly is visible when in typical use. The upper diffuser 70 can be a 15 degree diffuser and the lower diffuser 72 can be a 20 degree diffuser, and other specifications are possible. Preferably, the lower diffuser 72 is removable, for example, for situations where lateral glare must be minimized. Preferably, the lower diffuser 72 is removable from within the room, below the light fixture.

A kicker 76 can extend downwardly from the bottom 74 of the trim element 26. The kicker can be about ¼" in height and preferably is substantially arcuate and extends around a portion of the trim element 26, for example about 180 degrees around the trim element. A radially interior surface 78 of the kicker 76 is preferably parallel or substantially parallel to the optical axis 40 and at least an intermediate portion of a radially interior surface 78 of the kicker 76 can include a specular finish to enhance reflectivity, while the two end portions of the kicker 76 can have a non-specular finish. A backside (or side facing away from the adjacent wall 13) is preferably white such that it blends with the ceiling color to minimize the appearance of the kicker. However, the kicker is optional and can be omitted if desired for aesthetic or other purposes.

Preferably, the interior surface 77 of the trim element 26 includes a black specular finish to reduce glare and generate higher light output.

Figure 10:
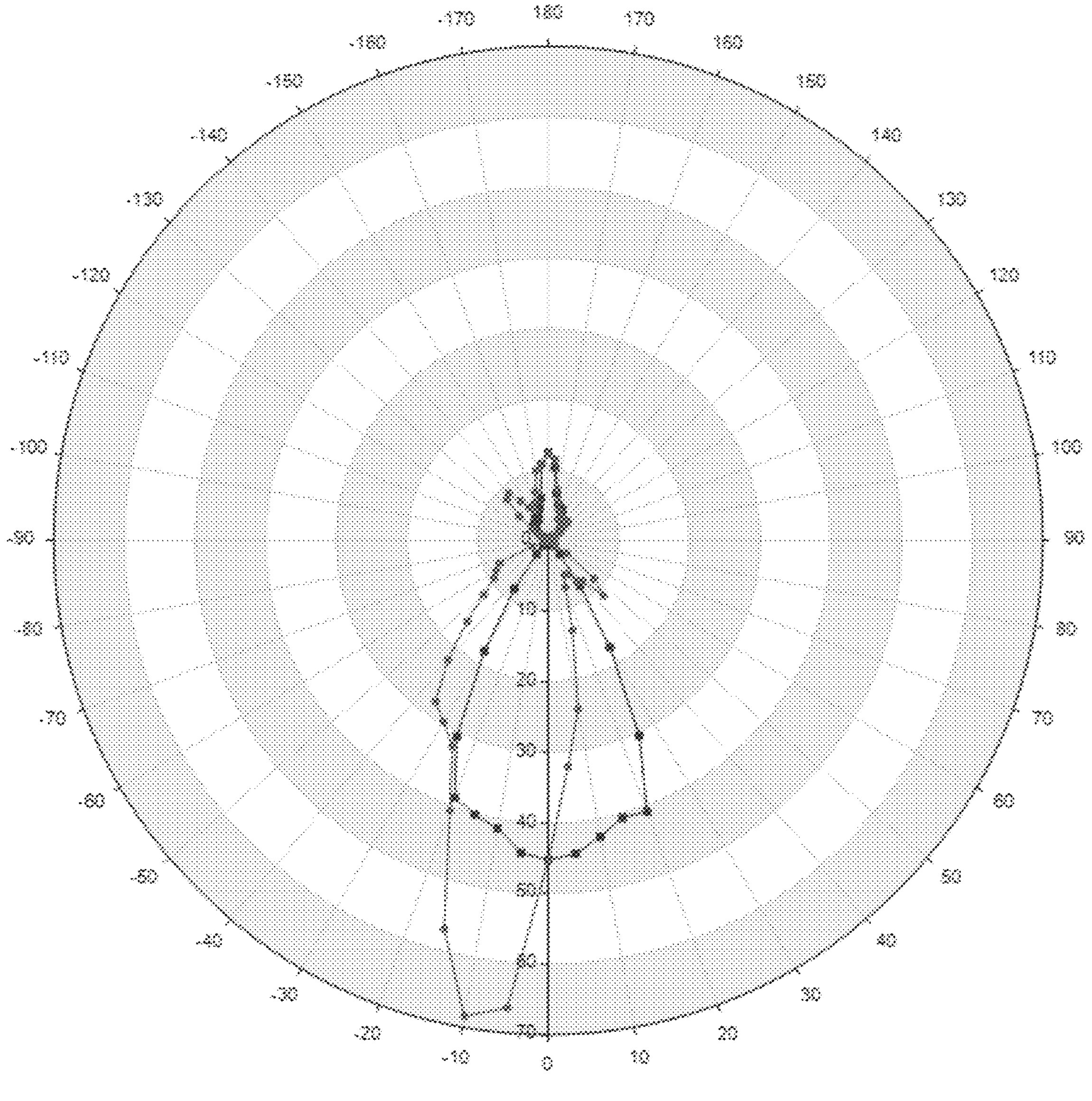
FIG. 10 is an exemplary light distribution curve for the light fixture of FIG. 1.

Referring to FIG. 10, the configuration of the light fixture 10 and, in particular, the light engine assembly 20, provides superior light distribution for wall-wash applications. The light distribution shown in FIG. 10 is the type of distribution needed to achieve the desired general and specific performance in the wall wash lighting application, which is described above in in the Background of the Invention.

Figure 11:
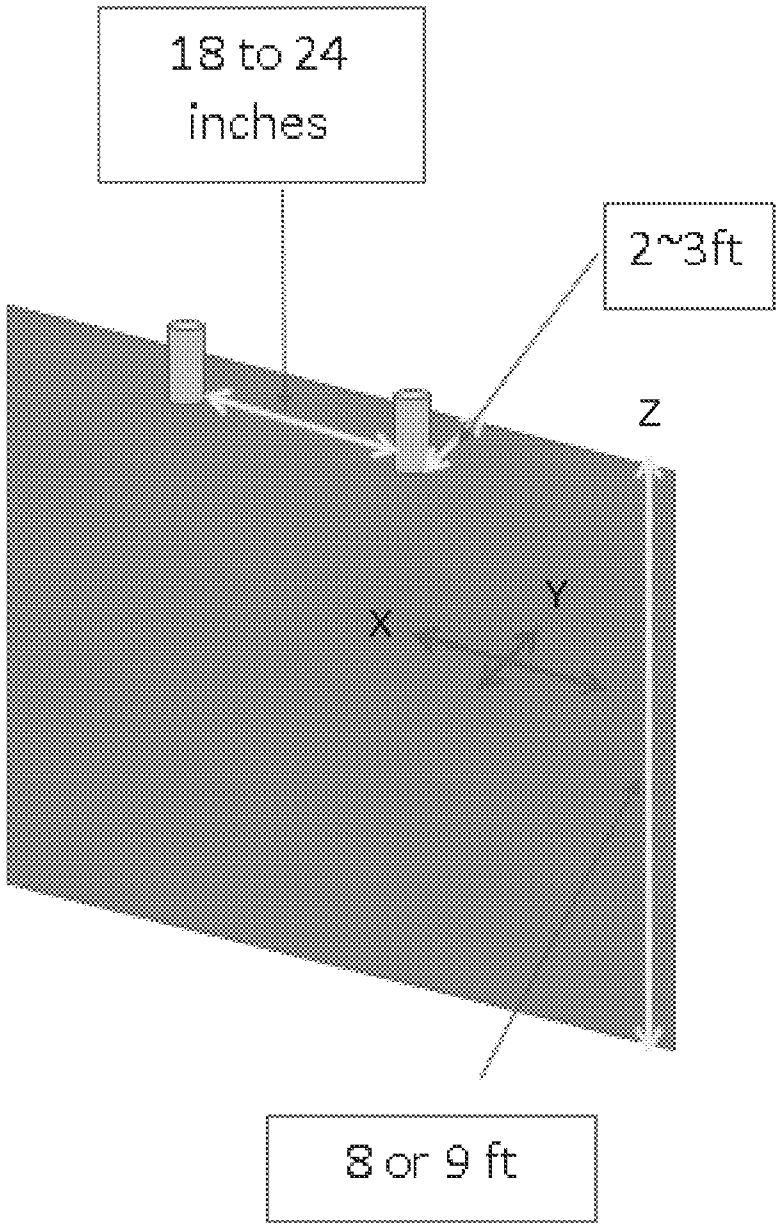
FIG. 11 is a schematic view of a preferred layout of the wall wash light fixtures in a room, adjacent a wall to be illuminated.
Figure 12A:
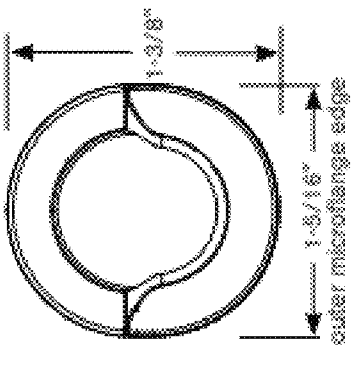
FIG. 12A is bottom plan view of the trim element of the light fixture of FIG. 1.
Figure 12B:
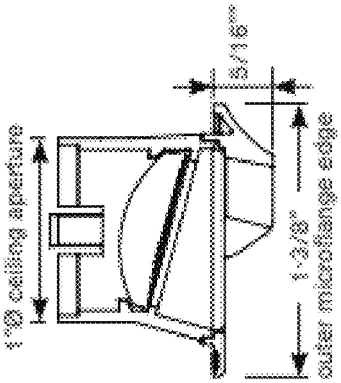
FIG. 12B is a side cross-sectional view trim element of the light fixture of FIG. 1.
Figure 12C:
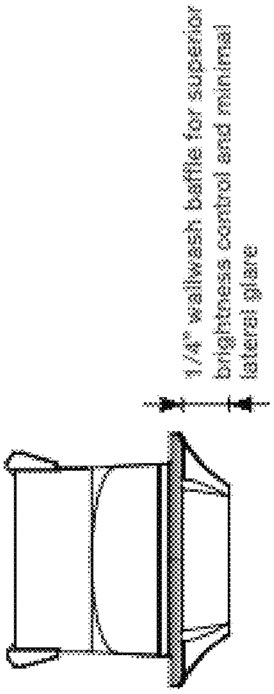
FIG. 12C is a front elevational view trim element of the light fixture of FIG. 1.

Referring to FIG. 11, usually the required setback and spacing requirements for wall wash lighting fixtures is proportional to the size of the aperture of the fixtures. For example, in a typical layout for wall wash fixtures for typical wall heights of, for example, 8-9 feet, a series of wall wash fixtures 10, 10' are installed in a ceiling at a set back distance of for example 2-3 feet, and are spaced laterally, parallel to the wall at a distance of, for example 18 to 24 inches. However, the even though the wall wash light fixture disclosed herein has a small aperture, the light distribution of the light fixture is superior to prior devices and allows for larger setback and/or spacing than prior devices.

Figure 13A:
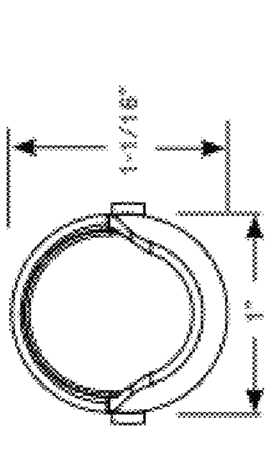
FIG. 13A is bottom plan view of the trim element of a second preferred embodiment of the light fixture.
Figure 13B:
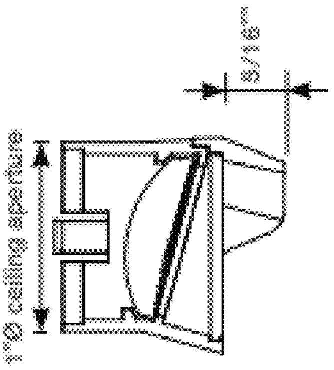
FIG. 13B is a side cross-sectional view trim element of FIG. 13A.
Figure 13C:
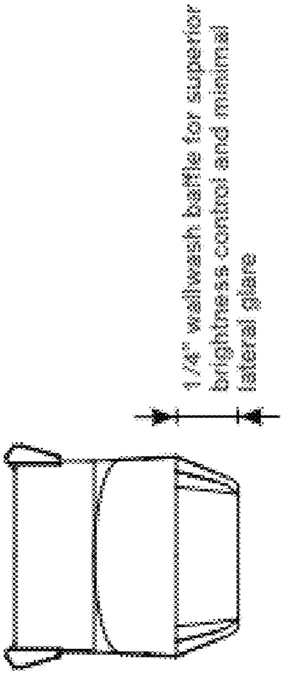
FIG. 13C is a front elevational view trim element of FIG. 13A.

Referring to FIGS. 13A-13C, in a second preferred embodiment of the light fixture, the trim element 126 can be configured as disclosed with respect to the first preferred embodiment but can be without a circumferential flange (86).

It should be understood, of course, that the specific form of the invention herein illustrated and described is intended to be representative only, as certain changes may be made therein without departing from the clear teachings of the disclosure. Accordingly, reference should be made to the following appended claims in determining the scope of the claimed invention.

What is claimed is:

1. A wall wash recessed light fixture operable to emit light through an opening in a ceiling toward a wall adjacent to the opening, the light fixture comprising;

an aperture, an LED module operable to emit light through the aperture, a lens disposed between the LED module and the aperture, and a reflector disposed between the LED module and the lens;

mutually perpendicular longitudinal axis (Z), lateral axis (Y) and width axis (X);

the LED module having an optical axis passing through the aperture and substantially parallel to the longitudinal axis (Z); and the lens having a first side forming a plano-convex lens with a convex surface facing the LED module and having a second side with a Fresnel lens surface facing the aperture, and the lens being aligned at an oblique angle $\Theta_1$ relative to the optical axis of the LED module.

2. The wall wash recessed light fixture of claim 1, wherein:

the plano-convex lens has a principal axis aligned at the oblique angle $\Theta_1$ relative to the optical axis of the LED module.

3. The wall wash recessed light fixture of claim 2, wherein:

the plano-convex lens has a center of curvature and the aperture of the light engine assembly is disposed between the center of curvature and the lens.

4. The wall wash recessed light fixture of claim 3, wherein:

the center of curvature of the plano-convex lens is offset laterally from the optical axis.

5. The wall wash light fixture of claim 4, wherein:

the plano-convex lens is partially cylindrical and has an axis of curvature passing through the center of curvature and perpendicular to the optical axis of the LED module.

6. The wall wash recessed light fixture of claim 1, wherein:

the Fresnel lens surface is aligned at the oblique angle $\Theta_1$ relative to the optical axis of the LED module.

7. The wall wash recessed light fixture of claim 6, wherein:

the lens has a first lateral end and a second lateral end, and the first lateral end being closer to the LED module than the second lateral end;

the Fresnel lens surface having a plurality of facets, and the facets having varying slope angles that increase from the first lateral end to the second lateral end.

8. The wall wash recessed light fixture of claim 7, wherein:

the facets of the Fresnel lens surface are aligned substantially parallel to the width axis (X) of the light engine assembly.

9. The wall wash recessed light fixture of claim 1, wherein:

the lens of the light engine assembly is operable to narrow a beam of light from the LED module vertically along a height of the adjacent wall, and to expand the beam horizontally along a length of the wall.

10. The wall wash recessed light fixture of claim 1, wherein:

the plano-convex lens and the Fresnel lens comprise an integrated lens.

11. The wall wash recessed light fixture of claim 1, further comprising:

a kicker reflector disposed adjacent the second lateral end of the lens; and the aperture being disposed between the kicker reflector and the lens.

12. The wall wash recessed light fixture of claim 1, wherein:

a diffuser is disposed adjacent the Fresnel lens surface and is aligned at the oblique angle $\Theta_1$ relative to the optical axis of the LED module.

13. The wall wash recessed light fixture of claim 12, wherein:

a second diffuser is disposed in the aperture of the light engine assembly, and the second diffuser is perpendicular to the optical axis.

14. The wall wash recessed light fixture of claim 1, wherein:

a diffuser is disposed in the aperture of the light engine assembly and is perpendicular to the optical axis.

15. The wall wash recessed light fixture of claim 1, further comprising:

a light engine assembly having the aperture, the LED module, the lens, and the reflector;

an enclosure having an enclosure aperture and the enclosure being adapted to be mounted to a ceiling structure; and the light engine assembly being configured to be mountable to the enclosure through the enclosure aperture.

* * * * *